(12) United States Patent
Kravets

(10) Patent No.: US 8,798,190 B2
(45) Date of Patent: Aug. 5, 2014

(54) COMMUNICATIONS DEVICES WITH ENVELOPE EXTRACTION AND RELATED METHODS

(75) Inventor: Oleksiy Kravets, Petersburg (CA)

(73) Assignee: BlackBerry Limited, Waterloo, Ontario (CA)

( * ) Notice: Subject to any disclaimer, the term of this patent is extended or adjusted under 35 U.S.C. 154(b) by 505 days.

(21) Appl. No.: 13/018,866

(22) Filed: Feb. 1, 2011

(65) Prior Publication Data
US 2012/0195254 A1    Aug. 2, 2012

(51) Int. Cl.
*H04L 27/00* (2006.01)
(52) U.S. Cl.
USPC ................... 375/295; 375/297; 375/300
(58) Field of Classification Search
USPC ................................ 375/295, 297, 300
See application file for complete search history.

(56) References Cited

U.S. PATENT DOCUMENTS

| | | | |
|---|---|---|---|
| 6,242,975 B1 * | 6/2001 | Eidson et al. | 330/124 R |
| 6,404,823 B1 | 6/2002 | Grange et al. | 375/297 |
| 7,519,336 B2 | 4/2009 | Vepsalainen et al. | |
| 7,627,055 B2 | 12/2009 | Coersmeier | 375/296 |
| 2004/0219891 A1 | 11/2004 | Hadjichristos | 455/102 |
| 2008/0267275 A1 * | 10/2008 | Li et al. | 375/228 |
| 2009/0029664 A1 * | 1/2009 | Batruni | 455/212 |
| 2010/0124889 A1 * | 5/2010 | Osman et al. | 455/108 |
| 2011/0112845 A1 * | 5/2011 | Jasiuk et al. | 704/500 |
| 2011/0129037 A1 * | 6/2011 | Staszewski et al. | 375/316 |

FOREIGN PATENT DOCUMENTS

EP     2083542     7/2009     ............. H04L 27/36

OTHER PUBLICATIONS

Jeong et al., "Wideband envelope tracking power amplifier with reduced bandwidth power supply waveform", Microwave Symposium Digest, Jun. 2009, pp. 1381-1384.
Modi et al., "A limited bandwidth envelope follower for efficiency enhancement in a linear power amplifier in broadband transmitters", IEEE, Oct. 2008, pp. 1-4.
Li et al., "System design issues in a HQPM-based transmitter", IEEE, 2007, pp. 77-80.
Masse, "A direct-conversion transmitter for WiMAX and WiBro applications", RFDesign (www.rfdesign.com), Jan. 2006, pp. 42, 44, 46.

* cited by examiner

*Primary Examiner* — Leila Malek
(74) *Attorney, Agent, or Firm* — Allen, Dyer, Doppelt, Milbrath & Gilchrist, P.A.

(57) ABSTRACT

A communications device may include an encoder generating digital baseband In-phase (I) and Quadrature (Q) signals, a processor coupled to the encoder and extracting an envelope characteristic from the digital baseband I and Q signals based upon a bandwidth of the digital baseband I and Q signals. A power amplifier may be coupled downstream from the processor and may generate an amplified I and Q signal based upon the envelope characteristic.

21 Claims, 4 Drawing Sheets

COMMUNICATIONS DEVICES WITH ENVELOPE EXTRACTION AND RELATED METHODS

TECHNICAL FIELD

This application relates to the field of communications, and more particularly, to wireless communications systems and related methods.

BACKGROUND

Cellular communication systems continue to grow in popularity and have become an integral part of both personal and business communications. Cellular telephones allow users to place and receive phone calls most anywhere they travel. Moreover, as cellular telephone technology is advanced, so too has the functionality of cellular devices. For example, many cellular devices now incorporate Personal Digital Assistant (PDA) features such as calendars, address books, task lists, calculators, memo and writing programs, etc. These multi-function devices usually allow users to wirelessly send and receive electronic mail (email) messages and access the internet via a cellular network and/or a wireless local area network (WLAN), for example.

Cellular devices have radio frequency (RF) processing circuits and receive or transmit radio communications signals typically using modulation schemes. For example, one particularly advantageous modulation scheme is a Quadrature modulation, which may be used in third and fourth generation cellular transceivers. Quadrature modulation and demodulation circuits may create linearity issues with power amplifiers and sometimes suffer poor antenna match. This can cause some degradation of total radiated power (TRP) and raise harmonic interference issues because of the greater non-linearity of a power amplifier.

Another modulation approach is a polar modulation, which may be more power efficient than Quadrature modulation approaches. Nevertheless, cellular devices that use polar modulation circuits may become overly complex when designed to transmit large bandwidth signals, for example, third and fourth generation cellular transceiver signals. For example, broadband applications in polar modulation circuits may incur a complicated phase locked loop (PLL) design, onerous expansion of signal bandwidth during polar modulation processing, and a difficult power amplifier design. On the other hand, Quadrature modulation devices may more readily handle broadband applications, but also may consume more power.

DETAILED DESCRIPTION OF THE PREFERRED EMBODIMENTS

Figure 1:
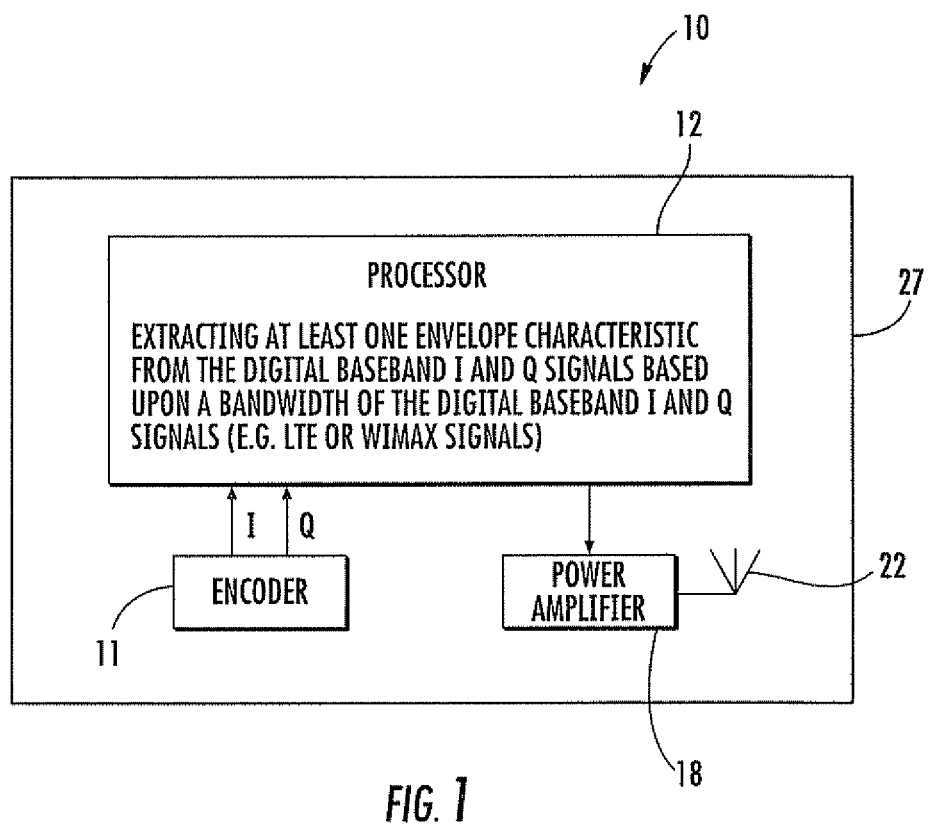
FIG. 1 is a schematic block diagram of an example embodiment of a communications device.

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Like numbers refer to like elements throughout, and prime notation is used to indicate similar elements in alternative embodiments.

An aspect is directed to a communications device. The communications device may include an encoder configured to generate digital baseband In-phase (I) and Quadrature (Q) signals, and a processor coupled to the encoder and configured to extract at least one envelope characteristic from the digital baseband I and Q signals based upon a bandwidth of the digital baseband I and Q signals. The communications device may further include a power amplifier coupled downstream from the processor and configured to generate an amplified I and Q signal based upon the at least one envelope characteristic.

More specifically, the processor may be configured to extract the at least one envelope characteristic from the digital baseband I and Q signals to generate near constant envelope I and Q signals when the bandwidth of an amplitude of the digital baseband I and Q signals is less than a threshold value. Also, the processor may be configured to extract the at least one envelope characteristic from at least a part of a spectrum of the digital baseband I and Q signals when the bandwidth of the digital baseband I and Q signals is greater than a threshold value.

In some embodiments, the communications device may further comprise I and Q circuits coupled between the processor and the power amplifier. Each of the I and Q circuits may comprise a digital-to-analog converter (DAC), a low pass filter coupled to an output of the DAC, and a mixer coupled to an output of the low pass filter.

Additionally, the communications device may further comprise an adder configured to combine outputs from the mixers in the I and Q circuits and generate a pre-amplification signal for the power amplifier. The communications device may further include an oscillator, and a frequency divider coupled thereto and cooperating with the mixers for phase shifting the I and Q phase signals by ninety degrees. The communications device may also comprise an antenna coupled to the power amplifier. For example, the digital baseband I and Q signals may comprise at least one of a Long Term Evolution (LTE) Advanced 3GPP baseband signal, and a IEEE 802.16m (WiMAX) baseband signal.

Another aspect is directed to a method of operating a communications device. The method may comprise using an encoder to generate digital baseband I and Q signals, using a processor coupled to the encoder to extract at least one envelope characteristic from the digital baseband I and Q signals based upon a bandwidth of the digital baseband I and Q signals, and using a power amplifier coupled downstream from the processor to generate an amplified I and Q signal based upon the at least one envelope characteristic.

Example mobile wireless communications devices may include portable or personal media players (e.g., music or MP3 players, video players, etc.), remote controls (e.g., television or stereo remotes, etc.), portable gaming devices, portable or mobile telephones, smartphones, tablet computers, etc.

Referring now to FIG. 1, a wireless communication system 10 according to the present disclosure is now described. The communications device 10 illustratively includes a housing 27, an encoder 11 carried by the housing and configured to generate digital baseband I and Q signals, and a processor 12 carried by the housing and coupled to the encoder and configured to extract at least one envelope characteristic from the digital baseband I and Q signals based upon a bandwidth of the digital baseband I and Q signals. The communications device 10 illustratively includes a power amplifier 18 carried by the housing 27, coupled downstream from the processor 12, and configured to generate an amplified I and Q signal based upon the at least one envelope characteristic. The communications device 10 illustratively includes an antenna 22 coupled to the power amplifier 18.

Figure 2:
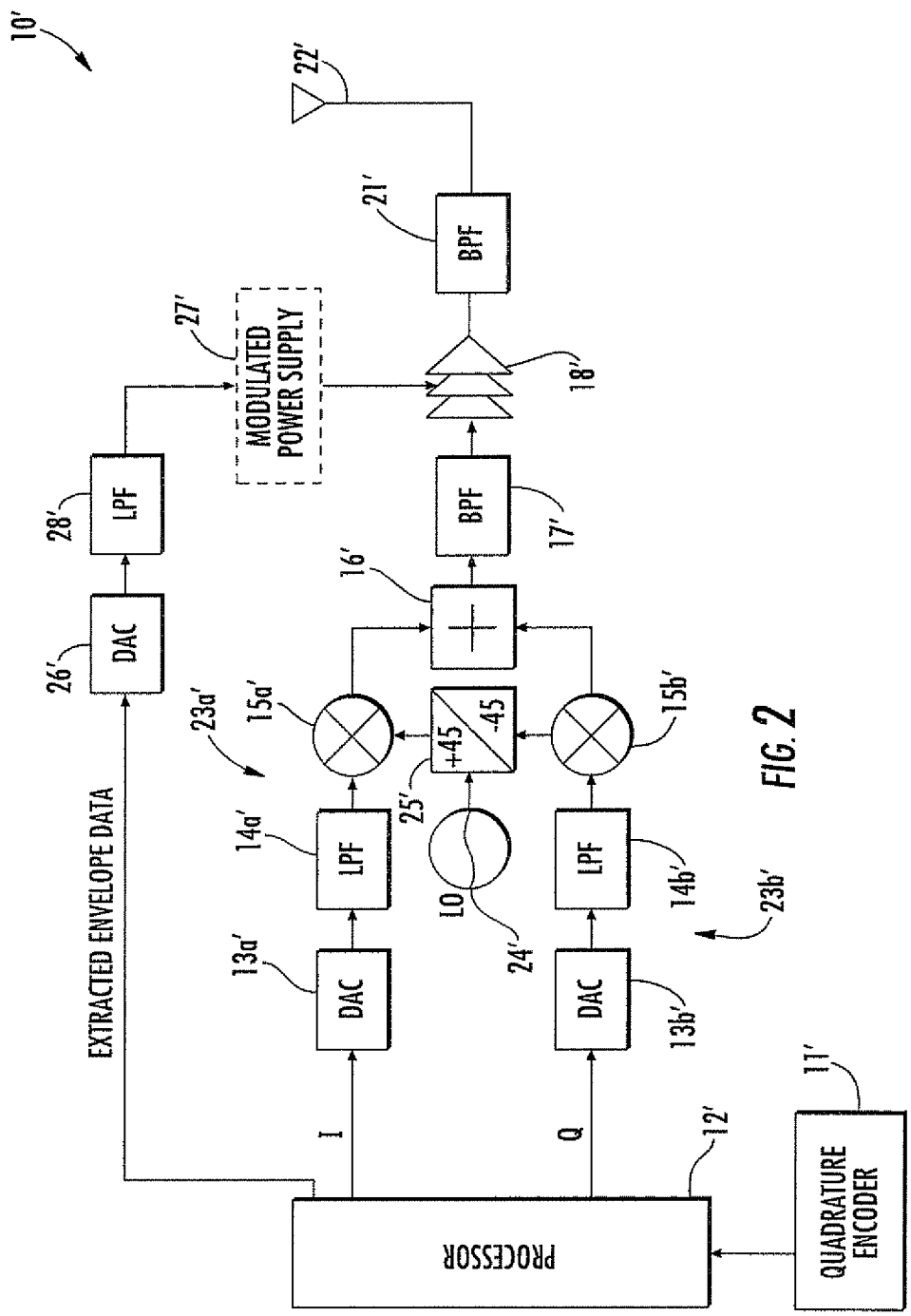
FIG. 2 is a detailed schematic block diagram of an example embodiment of a communications device.
Figure 3:
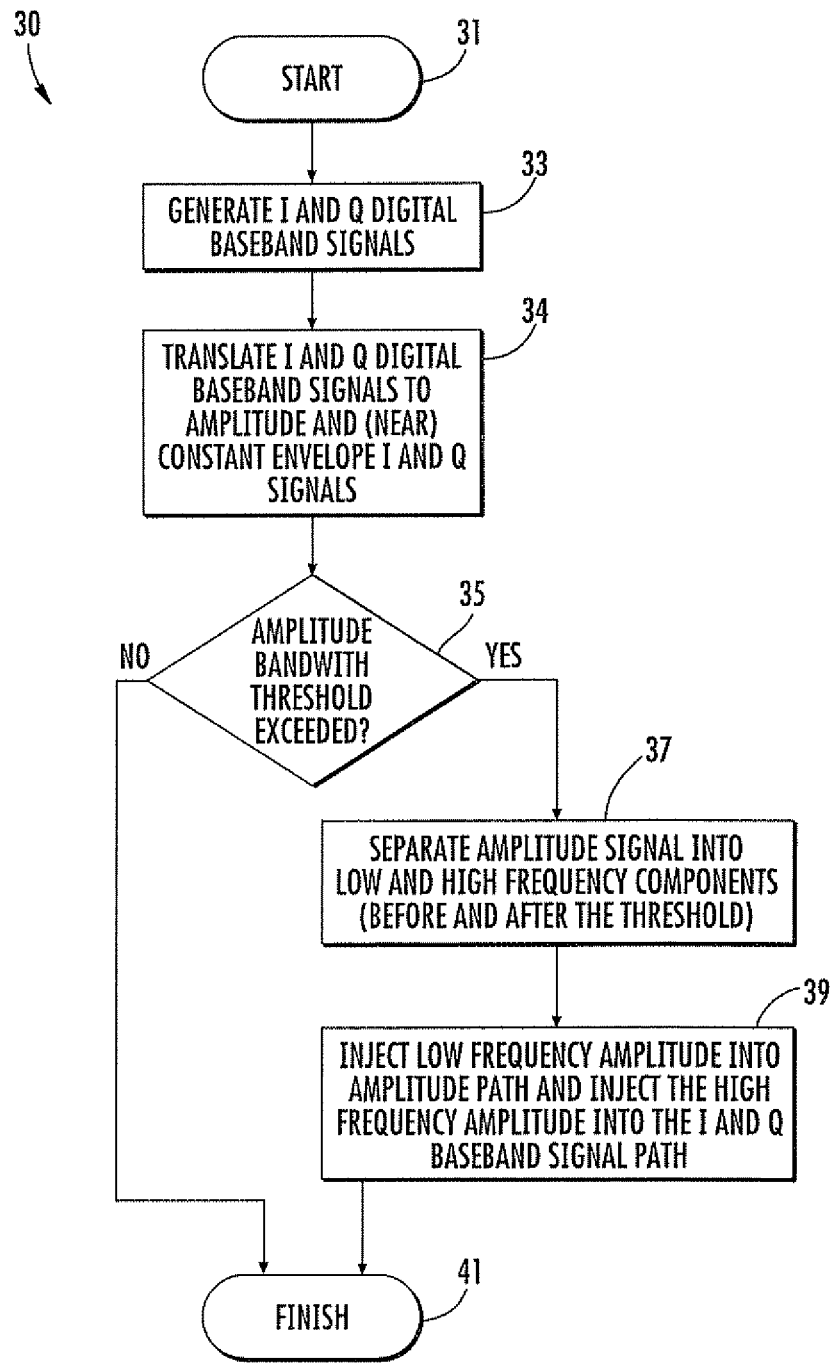
FIG. 3 is a flowchart illustrating operation of the communications device of FIG. 2.

Referring now additionally to FIG. 2, another embodiment of the communications device 10 is now described. In this embodiment of the communications device 10', those elements already discussed above with respect to FIG. 1 are given prime notation and most require no further discussion herein. Moreover, with reference additionally to FIG. 3, a flowchart 30 illustrates a method of operating the wireless communication system 10' (Block 31).

This embodiment differs from the previous embodiment in that the communications device 10' further includes several additional components between the antenna 22' and the processor 12'. In this embodiment, the processor 12' receives the digital baseband I and Q signals and determines bandwidth characteristics for the signals (Blocks 33-35), of course, this is subsequent to translating the digital baseband I and Q signals into amplitude and near constant (constant in certain applications) envelope I and Q signals. Moreover, the processor 12' illustratively stores a bandwidth threshold value. When the amplitude bandwidth of the digital baseband I and Q signals is less than the threshold value, the processor 12' is configured to extract the at least one envelope characteristic from the digital baseband I and Q signals to generate constant or near constant envelope I and Q signals. In other words, the processor 12' extracts substantially all of the envelope data from the digital baseband I and Q signals.

The processor 12' determines whether the amplitude bandwidth threshold is exceeded by first passing the amplitude signal through fast Fourier transform function to convert the signal to the frequency domain. Once in the frequency domain, the determination regarding amplitude bandwidth is made.

Alternatively, when the bandwidth of an amplitude of the digital baseband I and Q signals is greater than the threshold value, the processor 12' is be configured to extract the at least one envelope characteristic from at least a part of a spectrum of the digital baseband I and Q signals (Blocks 37 and 39). In other words, the processor 12' only removes the envelope data from certain portions of the digital baseband I and Q signals spectrum. (Block 41). More specifically, the processor 12' separates the amplitude signal into low and high frequency components and injects the former into the amplitude path (extracted envelope data path 26'-28', including the low pass filter) and the latter into the digital baseband I and Q signal path.

Advantageously, the removal of the envelope data provides a near constant envelope signal for amplification by the power amplifier 18'. With a near constant envelope signal, the power amplifier 18' can be operated in a saturated mode, which is a substantially more power efficient mode of operation. More so, the processor 18' does not expend unnecessary resources removing all envelope data from wideband signals. For example, the digital baseband I and Q signals may each comprise at least one of a Long Term Evolution (LTE) Advanced 3GPP baseband signal, and a IEEE 802.16m (WiMAX) baseband signal. In particular, the processor 12' only removes a portion of the envelope data from the wideband digital baseband I and Q signals, thereby reducing the complexity of the processor digital signal processing modules.

The communications device 10' illustratively includes I and Q circuits 23a'-23b' coupled between the processor 12' and the power amplifier 18'. Each of the I and Q circuits 23a'-23b' illustratively includes a digital-to-analog converter (DAC) 13a'-13b', a low pass filter 14a'-14b' coupled to an output of the DAC, and a mixer 15a'-15b' coupled to an output of the low pass filter. Additionally, the communications device 10' illustratively includes an adder 16' configured to combine outputs from the mixers 15a'-15b' in the I and Q circuits and generate a pre-amplification signal for the power amplifier 18'. The communications device 10' illustratively includes an oscillator 24', and a frequency divider 25' coupled thereto and cooperating with the mixers 15a'-15b' for phase shifting the I and Q phase signals by ninety degrees. The communications device 10' illustratively includes a band pass filter 17' coupled between the power amplifier 18' and the adder 16', and a band pass filter 21' coupled between the antenna 22' and the power amplifier.

The communications device 10' illustratively includes a path coupling the processor 12' and the power amplifier 18'. The path illustratively includes a DAC 26', a low pass filter 28' coupled thereto, and a modulated power supply 27' (shown with shadowed lines) coupled between the low pass filter and the power amplifier 18'. As will be appreciated by the skilled person, the extracted envelope data is used to modulate the power supply 27' to effect the reintroduction of the envelope data into the transmitted signal. As will be appreciated by the skilled person, the extracted envelope data may be reintroduced in other ways.

Example components of a mobile wireless communications device 1000 that may be used in accordance with the above-described embodiments are further described below with reference to FIG. 4. The device 1000 illustratively includes a housing 1200, a keyboard or keypad 1400 and an output device 1600. The output device shown is a display 1600, which may comprise a full graphic liquid crystal display (LCD). Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 4:
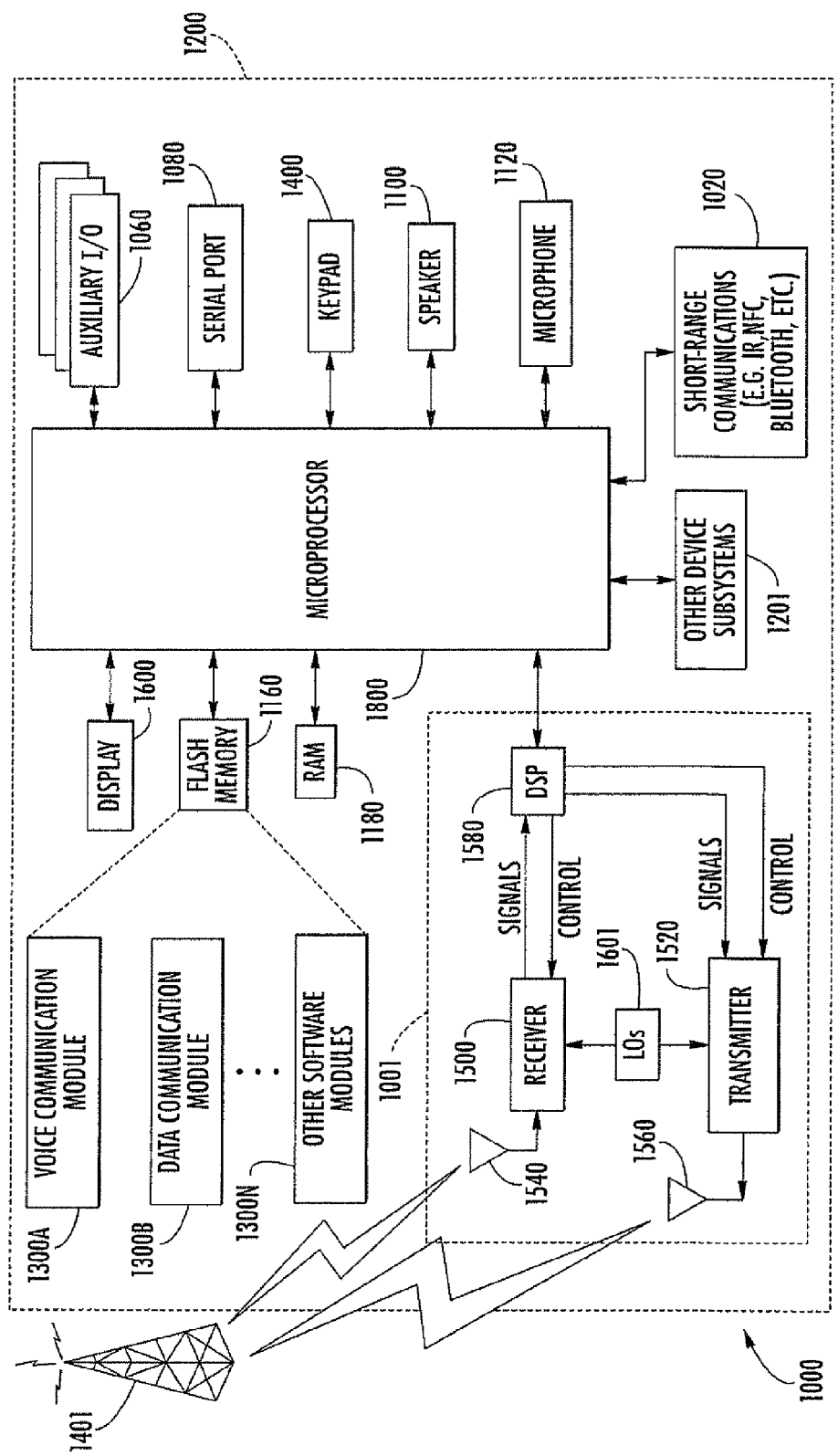
FIG. 4 is a schematic block diagram illustrating example components of a mobile wireless communications device that may be used with the communication devices of FIGS. 1-2.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM)

1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem 1020. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), code division multiple access (CDMA), Wideband code division multiple access (W-CDMA), personal communications service (PCS), Global System for Mobile Communications (GSM), enhanced data rates for GSM evolution (EDGE), etc. Other types of data and voice networks, both separate and integrated, may also be utilized with the mobile device 1000. The mobile device 1000 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communications device comprising:
 an encoder configured to generate digital baseband In-phase (I) and Quadrature (Q) signals;
 a processor coupled to said encoder and configured to
  when a bandwidth of the digital baseband I and Q signals is less than a threshold value, extract at least one envelope characteristic from the digital baseband I and Q signals to generate near constant envelope I and Q signals, and
  when the bandwidth of the digital baseband I and Q signals is greater than the threshold value, extract the at least one envelope characteristic from a part of a spectrum of the digital baseband I and Q signals, the part of the spectrum being below a frequency threshold; and a power amplifier coupled downstream from said processor and configured to generate an amplified I and Q signal based upon the at least one envelope characteristic.

2. The communications device according to claim 1 further comprising I and Q circuits coupled between said processor and said power amplifier.

3. The communications device according to claim 2 wherein each of said I and Q circuits comprises a digital-to-analog converter (DAC) configured to generate I and Q signals, a low pass filter coupled to an output of said DAC, and a mixer coupled to an output of said low pass filter.

4. The communications device according to claim 3 further comprising an adder configured to combine outputs from said mixers in said I and Q circuits and generate a pre-amplification signal for said power amplifier.

5. The communications device according to claim 4 further comprising an oscillator, and a frequency divider coupled thereto and cooperating with said mixers for phase shifting the I and Q signals by ninety degrees.

6. The communications device according to claim 1 further comprising an antenna coupled to said power amplifier.

7. The communications device according to claim 1 wherein the digital baseband I and Q signals comprise at least one of a Long Term Evolution (LTE) Advanced 3GPP baseband signal, and a IEEE 802.16m (WiMAX) baseband signal.

8. A communications device comprising:
an encoder configured to generate digital baseband In-phase (I) and Quadrature (Q) signals;
a processor coupled to said encoder and configured to
when a bandwidth of the digital baseband I and Q signals is less than a threshold value, extract at least one envelope characteristic from the digital baseband I and Q signals to generate near constant envelope I and Q signals, and
when the bandwidth of the digital baseband I and Q signals is greater than the threshold value, extract the at least one envelope characteristic from a part of a spectrum of the digital baseband I and Q signals, the part of the spectrum being below a frequency threshold;
a power amplifier coupled downstream from said processor and configured to generate an amplified I and Q signal based upon the at least one envelope characteristic;
I and Q circuits coupled between said processor and said power amplifier; and
an antenna coupled to said power amplifier.

9. The communications device according to claim 8 wherein each of said I and Q circuits comprises a digital-to-analog converter (DAC) configured to generate I and Q signals, a low pass filter coupled to an output of said DAC, and a mixer coupled to an output of said low pass filter.

10. The communications device according to claim 9 further comprising an adder configured to combine outputs from said mixers in said I and Q circuits and generate a pre-amplification signal for said power amplifier.

11. The communications device according to claim 10 further comprising an oscillator, and a frequency divider coupled thereto and cooperating with said mixers for phase shifting the I and Q signals by ninety degrees.

12. The communications device according to claim 8 wherein the digital baseband I and Q signals comprise at least one of a Long Term Evolution (LTE) Advanced 3GPP baseband signal, and a IEEE 802.16m (WiMAX) baseband signal.

13. A method of operating a communications device comprising:
using an encoder to generate digital baseband In-phase (I) and Quadrature (Q) signals;
using a processor coupled to the encoder to
when a bandwidth of the digital baseband I and Q signals is less than a threshold value, extract at least one envelope characteristic from the digital baseband I and Q signals to generate near constant envelope I and Q signals, and
when the bandwidth of the digital baseband I and Q signals is greater than the threshold value, extract the at least one envelope characteristic from a part of a spectrum of the digital baseband I and Q signals, the part of the spectrum being below a frequency threshold; and
using a power amplifier coupled downstream from the processor to generate an amplified I and Q signal based upon the at least one envelope characteristic.

14. The method according to claim 13 further comprising using an antenna coupled to the power amplifier to transmit the amplified I and Q signal.

15. The method according to claim 13 wherein the digital baseband I and Q signals comprise at least one of a Long Term Evolution (LTE) Advanced 3GPP baseband signal, and a IEEE 802.16m (WiMAX) baseband signal.

16. A mobile wireless cellular communications device comprising:
an encoder configured to generate digital baseband In-phase (I) and Quadrature (Q) signals;
a processor coupled to said encoder and configured to
when a bandwidth of the digital baseband I and Q signals is less than a threshold value, extract at least one envelope characteristic from the digital baseband I and Q signals to generate near constant envelope I and Q signals, and
when the bandwidth of the digital baseband I and Q signals is greater than the threshold value, extract the at least one envelope characteristic from at least a part of a spectrum of the digital baseband I and Q signals, the part of the spectrum being below a frequency threshold; and
a power amplifier coupled downstream from said processor and configured to generate an amplified I and Q signal based upon the at least one envelope characteristic.

17. The mobile wireless cellular communications device according to claim 16 further comprising an antenna coupled to said power amplifier.

18. The mobile wireless cellular communications device according to claim 16 wherein the digital baseband I and Q signals comprise at least one of a Long Term Evolution (LTE) Advanced 3GPP baseband signal, and a IEEE 802.16m (WiMAX) baseband signal.

19. A method of operating a mobile wireless cellular communications device comprising:
using an encoder to generate digital baseband In-phase (I) and Quadrature (Q) signals;
using a processor coupled to the encoder to
when a bandwidth of the digital baseband I and Q signals is less than a threshold value, extract at least one envelope characteristic from the digital baseband I and Q signals to generate near constant envelope I and Q signals, and
when the bandwidth of the digital baseband I and Q signals is greater than the threshold value, extract the at least one envelope characteristic from at least a part of a spectrum of digital baseband I and Q signals, the part of the spectrum being below a frequency threshold; and using a power amplifier coupled downstream from the processor to generate an amplified I and Q signal based upon the at least one envelope characteristic.

20. The method according to claim 19 further comprising using an antenna coupled to the power amplifier to transmit the amplified I and Q signal.

21. The method according to claim 19 wherein the digital baseband I and Q signals comprise at least one of a Long Term Evolution (LTE) Advanced 3GPP baseband signal, and a IEEE 802.16m (WiMAX) baseband signal.

* * * * *